E. A. HAWTHORNE.
LAMP BRACKET.
APPLICATION FILED AUG. 4, 1919.
1,379,761.
Patented May 31, 1921.
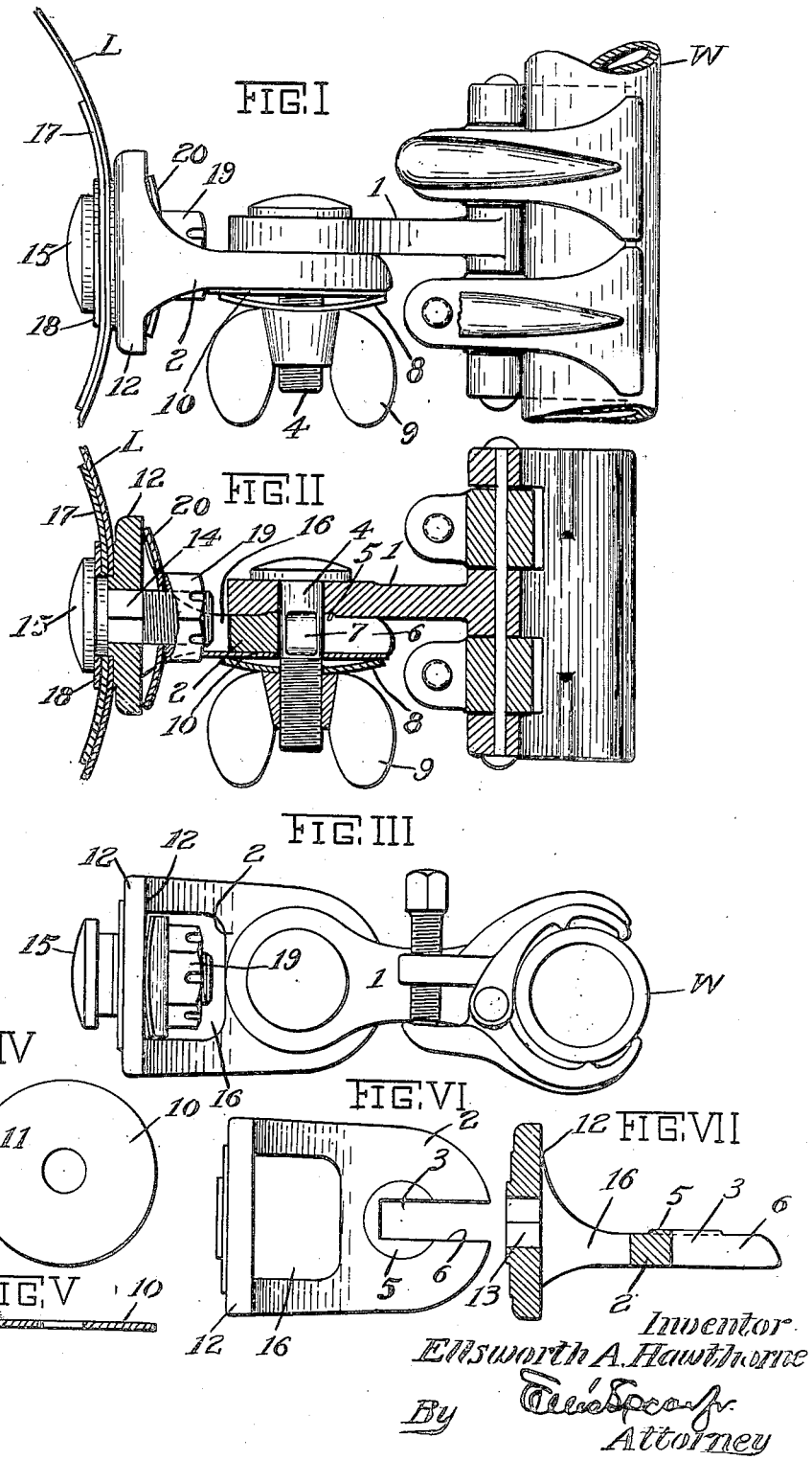
Inventor
Ellsworth A. Hawthorne
By
Attorney

UNITED STATES PATENT OFFICE.

ELLSWORTH A. HAWTHORNE, OF BRIDGEPORT, CONNECTICUT.

LAMP-BRACKET.

1,379,761.

Specification of Letters Patent.   Patented May 31, 1921.

Application filed August 4, 1919. Serial No. 315,076.

*To all whom it may concern:*

Be it known that I, ELLSWORTH A. HAW-THORNE, a citizen of the United States, residing at Bridgeport, county of Fairfield, State of Connecticut, have invented certain new and useful Improvements in Lamp-Brackets, of which the following is a specification.

This invention relates to a bracket for mounting a lamp of the spotlight type in universally adjustable relation upon the windshield of an automobile or the handle-bar of a motorcycle or bicycle, and particularly to a bracket of the type shown in my prior application, Serial No. 151,482, filed February 28, 1917, wherein the bracket is so designed as to be capable of adjustment exteriorly of the lamp, permitting rapid and economical assembly and convenient subsequent adjustment of the lamp whenever desired, without dismantling the lamp or disturbing the inside connections.

My present invention involves certain improvements upon the bracket shown in my said prior application, particularly as regards the arrangement for holding the adjustment of the lamp under the most excessive conditions of vibration in driving, for changing the adjustment of the bracket without disturbing the above-mentioned holding feature, and for permitting the detachment of the lamp carrying portion of the bracket and the lamp from the windshield without disturbing the setting of the windshield clamp.

The construction and manner of use of my present invention is described and illustrated in the following specification and drawings, throughout which like reference characters are correspondingly employed, and in the drawings:

Figure I is a side view of a bracket in accordance with my invention.

Fig. II is a longitudinal section thereof.

Fig. III is a plan.

Figs. IV and V are detail views of the castellated adjusting nut and the retainer therefor, and Figs. VI and VII are detail views of the slotted lamp carrying arm.

I have indicated at 1 a clamp carrying arm adapted to detachably engage the windshield tubing, handle bar or other support W, and at 2 a lamp carrying arm adapted to be connected with the lamp L.

The arm 2 is formed as a casting pierced at 3 to receive a bolt 4 which enters a corresponding hole in the arm 1, whereby to connect the arms 1 and 2 in superposed relatively rotatable relation.

Surrounding the hole 3 is a boss 5 which fits into a countersink formed in the arm 1. The hole 3 is intersected by a slot 6 extending longitudinally inwardly from the edge of the casting (see Figs. II and VI). Said slot permits the ready attachment and detachment of arm 1 without disturbing the adjustment of the lamp L. The sides of the bolt 4 are flatted as indicated at 7 to accommodate the slotted portion 6 of the casting 2. The adjustment of the bolt is held by a spring washer 8 and a wing nut 9. Between washer 8 and the adjacent face of casting 2 a retainer 10 is confined on the bolt 4. Said retainer is formed with a locking projection 11, and is adapted to hold the adjustment of the lamp attaching bolt.

Beyond the bolt hole 3 the casting 2 extends as a vertically disposed lamp attaching head 12 which is pierced as indicated at 13 to receive the squared portion 14 of a lamp attaching bolt 15. The headed end of bolt 15 is disposed within the lamp shell L and the threaded end extends through the shell and is exposed for access through an enlarged cut out 16 formed in the casting 2 beyond the head 12. The shell may be internally reinforced adjacent the bolt hole as indicated at 17 and a clamping washer 18 may be mounted on the bolt between the head thereof and said reinforcement 17.

The setting of the bolt is held by a castellated nut 19 applied thereto externally of the lamp and operating to frictionally set an extension spring washer 20 against the outer face of the head 12. The nut 19 is locked by the engagement of the locking projection 11 of retainer 10 in a castellation thereof.

The lamp may thus be turned about either the bolt 4 or the bolt 15 as an axis. By slacking the wing nut 9 and withdrawing arm 2 endwise through the open slot 6 in said arm, the lamp and lamp carrying arm 2 may be readily and quickly disconnected from the clamp carrying arm 1 without disturbing either the adjustment of the lamp on arm 2 or the setting of the windshield clamp which may thus remain attached to the windshield. The lamp may of course be swung about the bolt 4 as an axis without loosening either bolt 15 or retainer 10. In addition, the engagement of retainer 10 with the castellations of nut 19 prevents said nut from working loose and the lamp adjustment from changing under the vibratory effects of the vehicle in motion.

Various modifications in the construction of my invention may obviously be resorted to if within the limits of the appended claims.

What I therefore claim and desire to secure by Letters Patent is:

1. A lamp bracket comprising a pair of arms, a bolt connecting said arms for relative rotation, a set nut on said bolt, a retainer clamped by said nut, and a lamp attaching bolt mounted on one of said arms and locked by said retainer.

2. A lamp bracket comprising a clamp carrying arm adapted to engage a support and a lamp carrying arm, a swivel connection for said arms constructed and arranged to permit relative separation of said arms by endwise withdrawal of one from the other without disturbing either the adjustment of the clamp upon the support or the adjustment of the lamp upon the lamp carrying arm, a lamp attaching bolt set through said lamp carrying arm from within the lamp, a nut applied to the free end of said bolt, and a retainer for said nut mounted at said swivel connection.

3. A lamp bracket comprising a pair of superposed arms, a bolt connecting said arms for relative rotation, a retainer clamped to the bolt and disposed in a plane transverse to the bolt axis, and a lamp attaching bolt locked by said retainer.

4. A lamp bracket comprising a clamp carrying arm and a lamp carrying arm having bolt holes adapted to be registered with each other, and said lamp carrying arm having a slot extending from an edge thereof and intersecting its said bolt hole, and a bolt set through said bolt holes and connecting said arms for relative swiveling movement and withdrawable through said slot to permit separation of the arms without disturbing the adjustment of either the clamp or the lamp, a nut on said bolt for setting said bolt, a retainer clamped by said nut, and a lamp attaching bolt carried by said lamp arm and locked by said retainer.

5. A lamp bracket comprising a pair of superposed arms, a bolt connecting said arms for relative rotation, one of said arms having a slotted head disposed at substantially right angles to the plane of the arm, a lamp attaching bolt set through said head from within the lamp and disposed in a plane transverse to the axis of the swivel bolt, a nut on the free end of said lamp attaching bolt and exposed through the slot of said head, and a retainer clamped to said swivel bolt and engageable with said nut.

6. A lamp bracket comprising a pair of superposed arms, a bolt connecting said arms for relative rotation, one of said arms having a slotted head disposed at substantially right angles to the plane of the arm, a lamp attaching bolt set through said head from within the lamp and disposed in a plane transverse to the axis of the swivel bolt and a castellated nut on the free end of said lamp and attaching bolt and exposed through the slot of said head, and a retainer clamped to said swivel bolt and having a tooth engageable with a castellation of said nut.

In testimony whereof I affix my signature in presence of two witnesses.

ELLSWORTH A. HAWTHORNE.

Witnesses:
JOHN H. GEORGE,
E. HORACE HAWTHORNE.